United States Patent
Ueki (10) Patent No.: US 8,526,009 B2
(45) Date of Patent: Sep. 3, 2013

(54) APPARATUS FOR MEASURING ROTATIONALLY SYMMETRIC ASPHERIC SURFACE

(75) Inventor: Nobuaki Ueki, Saitama (JP)

(73) Assignee: Fujifilm Corporation, Tokyo (JP)

(*) Notice: Subject to any disclaimer, the term of this patent is extended or adjusted under 35 U.S.C. 154(b) by 89 days.

(21) Appl. No.: 13/108,475

(22) Filed: May 16, 2011

(65) Prior Publication Data
US 2011/0279823 A1    Nov. 17, 2011

(30) Foreign Application Priority Data
May 17, 2010  (JP) .................. 2010-113580

(51) Int. Cl.
*G01B 11/02* (2006.01)
*G01B 9/02* (2006.01)

(52) U.S. Cl.
USPC ................ 356/512; 356/513; 356/519

(58) Field of Classification Search
USPC ........................................ 356/512
See application file for complete search history.

(56) References Cited

U.S. PATENT DOCUMENTS

| | | | |
|---|---|---|---|
| 6,956,657 B2 | 10/2005 | Golini et al. | |
| 7,057,742 B2* | 6/2006 | Marron et al. | 356/512 |
| 7,397,570 B2* | 7/2008 | Kawasaki et al. | 356/512 |
| 7,522,292 B2* | 4/2009 | Doerband | 356/601 |
| 7,605,926 B1* | 10/2009 | Hetzler et al. | 356/515 |
| 2005/0275849 A1* | 12/2005 | Freimann et al. | 356/521 |

FOREIGN PATENT DOCUMENTS

JP    62-126305    6/1987

* cited by examiner

*Primary Examiner* — Tarifur Chowdhury
*Assistant Examiner* — Sunghee Y Gray
(74) *Attorney, Agent, or Firm* — Young & Thompson (57) ABSTRACT

A low coherent light from a white light source is emitted to a sample surface. A detour distance in a detour section is adjusted such that an optical path difference between a reference light and a sample light is equal to or shorter than a coherence length of interference light. The interference light is incident on an image sensor only when an inclination angle of a diffraction grating plate and a wavelength of the interference light satisfy a predetermined condition. Thus, an interference fringe image is formed. Based on each of the interference fringe images taken on a wavelength-by-wavelength basis of the interference light and an optical distance between a reference surface and the sample surface along an optical path of a measuring light at the time of taking the interference fringe image, a shape of the sample surface is measured.

6 Claims, 7 Drawing Sheets

APPARATUS FOR MEASURING ROTATIONALLY SYMMETRIC ASPHERIC SURFACE

BACKGROUND OF THE INVENTION

1. Field of the Invention

The present invention relates to an apparatus for measuring a rotationally symmetric aspheric surface.

2. Description Related to the Prior Art

Three-dimensional shape measurement using an optical probe has been known as a method for measuring a rotationally symmetric aspheric surface such as an aspheric lens. This method, however, requires a long measurement time per sample, for example, several hours.

On the other hand, a method for identifying a shape of a sample surface based on interference fringes has been known. In this method, spherical wave light is emitted to a rotationally symmetric aspheric surface of a sample. Light reflected from the sample surface is made to interfere with reference light to form the interference fringes. However, when a relative position between an interferometer and the sample surface is fixed, only the interference fringes corresponding to an extremely limited region on the sample surface is obtained.

The following methods have been known, which solve the above problem. In a method disclosed in Japanese Patent Laid-Open Publication No. 62-126305, a relative position between an interferometer and a sample surface is varied sequentially to generate interference fringes corresponding to each of the regions on the sample surface divided in a radial direction. The interference fringes generated at each of the relative positions are analyzed to obtain a shape of each of the regions on the sample surface. Then, the obtained shapes are put together to get the shape of the entire sample surface.

In a method disclosed in U.S. Pat. No. 6,956,657, a relative position between an interferometer and a sample surface is sequentially varied in a plane perpendicular to a measurement optical axis. Every time the relative position is changed, interference fringes, corresponding to a region on the sample surface, are enlarged enough to be analyzed and then an image of the interference fringes is taken. The interference fringe images are analyzed to obtain the shapes of the regions. Then the shapes of the regions are put together.

The methods disclosed in the Japanese Patent Laid-Open Publication No. 62-126305 and U.S. Pat. No. 6,956,657 carryout the surface measurement of a sample in a shorter measurement time than the three-dimensional shape measurement using the optical probe. These methods, however, require a mechanism for sequentially varying the relative position between the interferometer and the sample surface. As a result, a configuration of a surface measuring apparatus becomes complicated and upsized.

SUMMARY OF THE INVENTION

An object of the present invention is to provide an apparatus capable of measuring a rotationally symmetric aspheric surface without varying a relative position between an interferometer and a sample surface.

To achieve the above and other objects, an apparatus for measuring rotationally symmetric aspheric surface according to the present invention is provided with an interferometer unit, a diffractive optical element, an imaging section, an optical distance measuring section, and an analyzing section. The interferometer unit divides output light from a light source into a measuring light and a reference light at a reference surface and outputs the measuring light. The diffractive optical element has an annular diffraction grating composed of concentric annular areas. The diffractive optical element is disposed between the interferometer unit and the sample surface along an optical path of the measuring light. The diffractive optical element deflects the measuring light, outputted from the interferometer unit, by an angle determined by a wavelength of the measuring light and outputs the measuring light to the sample surface. The diffractive optical element deflects a sample light that is the measuring light reflected back from the sample surface, and outputs the sample light to the interferometer unit. The imaging section takes an interference fringe image formed by interference light into which the sample light from the diffractive optical element and the reference light are combined. The optical distance measuring section measures an optical distance between the reference surface and the sample surface along the optical path of the measuring light. The analyzing section analyzes a shape of the sample surface based on each of the interference fringe images taken on a wavelength-by-wavelength basis of the interference light and the optical distance at the time of taking each of the interference fringe images.

It is preferable that a relative position between the reference surface and the sample surface is fixed.

It is preferable that the light source is a white light source. It is preferable that the optical distance measuring section has a detour section, a detour distance adjuster, a wavelength analyzer, and an optical distance calculator. The detour section divides the output light from the white light source into a first flux and a second flux, and makes the first flux travel longer than the second flux by a detour distance and then recombines the first and second fluxes into a single light. The detour distance adjuster adjusts the detour distance of the first flux relative to the second flux in the detour section. The wavelength analyzer analyzes the wavelength of the interference light. The optical distance calculator calculates the optical distance based on the detour distance and the wavelength of the interference light.

A wavelength-variable laser can be used as the light source. It is preferable that the optical distance measuring section has a detour section, a detour distance adjuster, a wavelength modulator, a central wavelength scanner, and an optical distance calculator. The detour section divides an output laser beam from the laser into a first flux and a second flux and makes the first flux travel longer than the second flux by a detour distance, and then recombines the first and second fluxes into a single laser beam. The detour distance adjuster adjusts the detour distance of the first flux relative to the second flux in the detour section. The wavelength modulator modulates a wavelength of the output laser beam within a time shorter than a frame period of the imaging section such that the output laser beam has a same coherence length as that of low coherent light. The central wavelength scanner scans a central wavelength of the output laser beam in a predetermined range. The optical distance calculator calculates the optical distance between the reference surface and the sample surface based on the detour distance and the central wavelength of the output laser beam.

It is preferable that the optical distance measuring section has a wavelength scanner and an optical distance calculator. The wavelength scanner scans the wavelength of the output laser beam from the laser in a predetermined range. The optical distance calculator calculates the optical distance between the reference surface and the sample surface based on the number of times of changes in interference fringes in a predetermined pixel of each of the interference fringe images sequentially taken by the imaging section while the wavelength of the output laser beam is scanned.

Generally, the white light source refers to a light source outputting white light with a spectrum distribution covering the entire visible range, and visible as white light to the naked eye. In the present invention, however, the white light source is defined as a light source outputting light with a spectrum distribution of several hundreds nm (for example, 300 nm, preferably 400 nm) and above. Namely, the wavelength range of the white light source extends beyond the visible range.

In the apparatus for measuring a rotationally symmetric aspheric surface of the present invention, the diffractive optical element is disposed on the optical axis of the measuring light between the interferometer and the sample surface. The diffractive optical element diffracts and deflects the measuring light by an angle determined by a wavelength of the measuring light, and outputs the measuring light to the sample surface. Optical interference of the reference light and the sample light reflected from the sample surface and returned to the interferometer through the diffractive optical element forms the interference fringe image.

The apparatus for measuring the rotationally symmetric aspheric surface is provided with the optical distance measuring section for measuring the optical distance between the reference surface and the sample surface along the optical path of the measuring light, and an analyzing section for analyzing the shape of the sample surface based on each of the interference fringe images taken on a wavelength-by-wavelength basis of the interference light and the optical distance at the time of taking the interference fringe image. Thereby, a set of shape data corresponding to respective regions on the sample surface is obtained without varying the relative positions of the interferometer and the sample surface. The set of shape data is put together. Thus, the shape of the entire sample surface is obtained.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

First Embodiment

Figure 1:
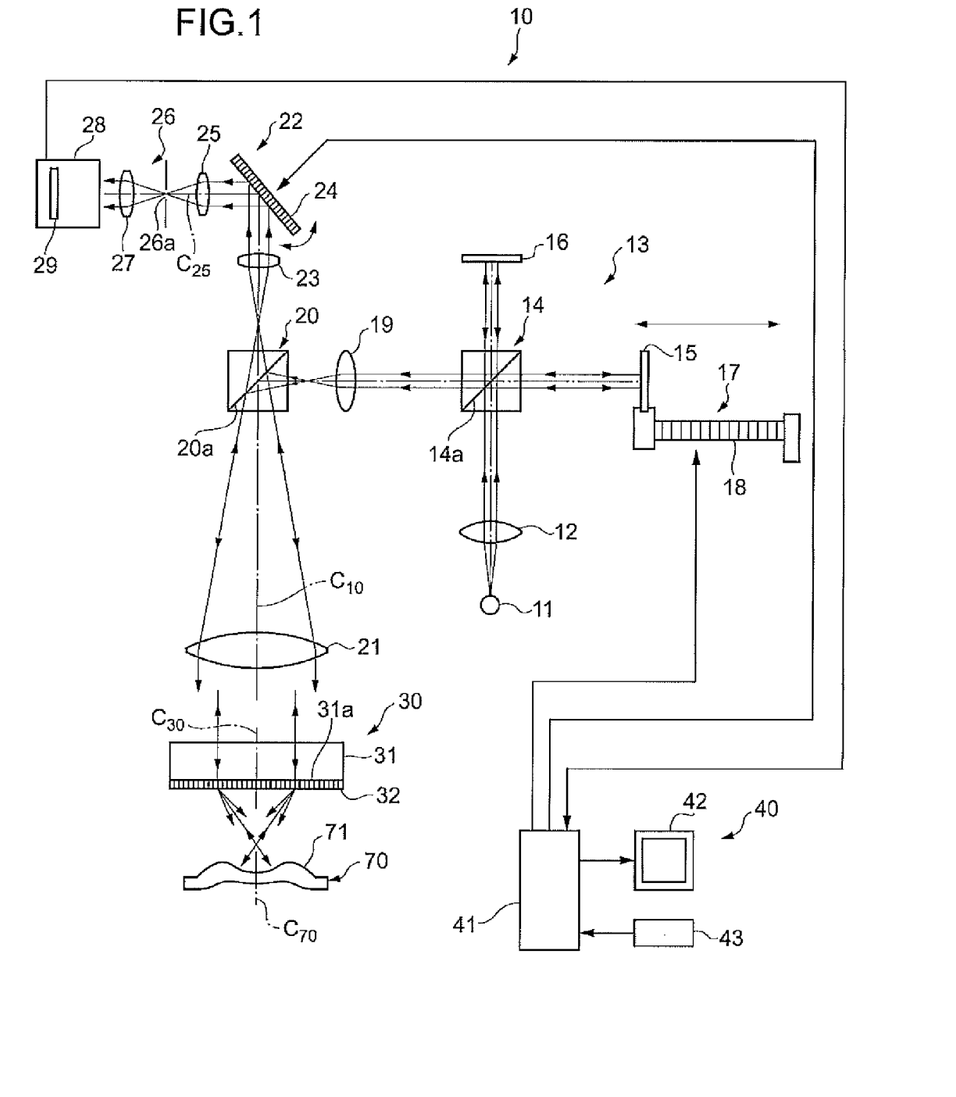
FIG. 1 is a schematic diagram of an apparatus for measuring a rotationally symmetric aspheric surface according to a first embodiment.

As shown in FIG. 1, an apparatus for measuring a rotationally symmetric aspheric surface according to a first embodiment is provided with an interferometer 10, an optical deflection element 30, and an analysis control unit 40, and measures a shape of a sample surface 71 of a sample lens 70. The sample surface 71 is an aspheric surface rotationally symmetric about an optical axis $C_{70}$.

The interferometer 10 is provided with a white light source 11 for outputting low coherent light, a collimator lens 12, a detour section 13, a beam diameter changing lens 19, a beam splitter 20, and a collimator lens 21. The light outputted from the white light source 11 is incident on the detour section 13 through the collimator lens 12. The detour section 13 divides the incident light into two fluxes and makes one of the two fluxes travel a longer optical distance than the other, and then recombines the two fluxes into a single light. The light, outputted from the detour section 13, is incident on the beam splitter 20 through the beam diameter changing lens 19. A beam splitting surface 20a of the beam splitter 20 directs the incident light downward in FIG. 1. The collimator lens 21 collimates the light outputted from the beam splitter 20 and then outputs the collimated light along an optical axis $C_{10}$. The interferometer 10 further includes a color separation optical system 22 for analyzing a wavelength of interference light, an imaging lens 27, and an imaging camera 28 having an image sensor 29 such as a CCD, a CMOS, or the like.

The detour section 13 is provided with a beam splitter 14, a movable mirror 15, a fixed mirror 16, and a movable mirror position adjuster 17. A beam splitting surface 14a of the beam splitter 14 divides the low coherent light incident thereon from the collimator lens 12 into a first flux and a second flux. The beam splitting surface 14a directs the first flux to the right and the second flux upward in FIG. 1. The movable mirror 15 is disposed on an optical path of the first flux outputted from the beam splitter 14. The fixed mirror 16 is disposed on an optical path of the second flux outputted from the beam splitter 14. The movable mirror position adjuster 17 includes a PZT element 18 to move the movable mirror 15 in a side-to-side direction in FIG. 1. In the detour section 13, the first flux makes a detour or travels a longer optical distance than the second flux by a predetermined detour distance. The detour distance is twice as long as a difference between an optical distance between the beam splitting surface 14a and the movable mirror 15 and an optical distance between the beam splitting surface 14a and the fixed mirror 16. Then the first and second fluxes are recombined into a single light at the beam splitting surface 14a of the beam splitter 14. The recombined light is outputted to the beam diameter changing lens 19.

The optical deflection element 30 is composed of a reference standard plate 31 and a diffractive optical element 32. The reference standard plate 31 is provided with a reference surface 31a perpendicular to an optical axis $C_{30}$. The reference surface 31a divides the output light (the collimated light) incident thereon from the interferometer 10 into two fluxes, and retroreflects or reflects back one of the two fluxes as a reference light to the interferometer 10. The reference surface 31a passes the other flux as a measuring light to the diffractive optical element 32. The diffractive optical element 32 is of a transmission type and has a diffraction grating. The diffraction grating is composed of annular areas formed concentrically about the optical axis $C_{30}$. The diffractive optical element 32 diffracts and deflects the measuring light, incident thereon from the reference surface 31a, by an angle determined by a wavelength of the measuring light, and outputs the measuring light to a region on the sample surface 71. Because the measuring light includes various wavelength components, the deflection angles of the wavelength components vary with their wavelengths. The diffractive optical element 32 deflects a sample light that is the measuring light reflected back from the sample surface 71, to be incident on the reference surface 31a. At the reference surface 31a, the sample light and the reference light are combined into the interference light. The interference light is outputted to the interferometer 10.

For the measuring light to be emitted to a region on the sample surface 71, normally, a positive or negative first-order diffracted light from the diffractive optical element 32 is used. In this specification, a positive light refers to a light propagating toward the optical axis $C_{30}$. A negative light refers to a light propagating away from the optical axis $C_{30}$. It is also possible to use higher-order positive and negative lights such as positive and negative second-order diffracted lights and positive and negative third-order diffracted lights.

The color separation optical system 22 is provided with a collimator lens 23, a reflecting-type diffraction grating plate 24, a converging lens 25, and a pinhole plate 26. The collimator lens 23 collimates the interference light incident thereon from the optical deflection element 30 through the collimator lens 21 and the beam splitter 20, and then outputs the collimated interference light to the diffraction grating plate 24. The diffraction grating plate 24 has two or more diffraction gratings extending in a direction perpendicular to a paper plane of FIG. 1. The diffraction grating plate 24 diffracts and deflects the interference light by a predetermined angle in accordance with the wavelength of the interference light. The converging lens 25 converges the interference light incident thereon from the diffraction grating plate 24. The pinhole plate 26 has a pinhole 26a at a focal point position on an optical axis $C_{25}$ of the converging lens 25. The diffraction grating plate 24 is supported by an inclination-angle adjusting mechanism (not shown) for changing an inclination angle of the diffraction grating plate 24 relative to an axis of the interference light outputted from the collimator lens 23. The interference light is outputted in the direction of the optical axis $C_{25}$ of the converging lens 25 only when the inclination angle and the wavelength of the interference light satisfy a predetermined condition. In other words, only the interference light outputted in the direction of the optical axis $C_{25}$ passes through the pinhole 26a and then forms an interference fringe image on the image sensor 29 through the imaging lens 27.

Figure 2:
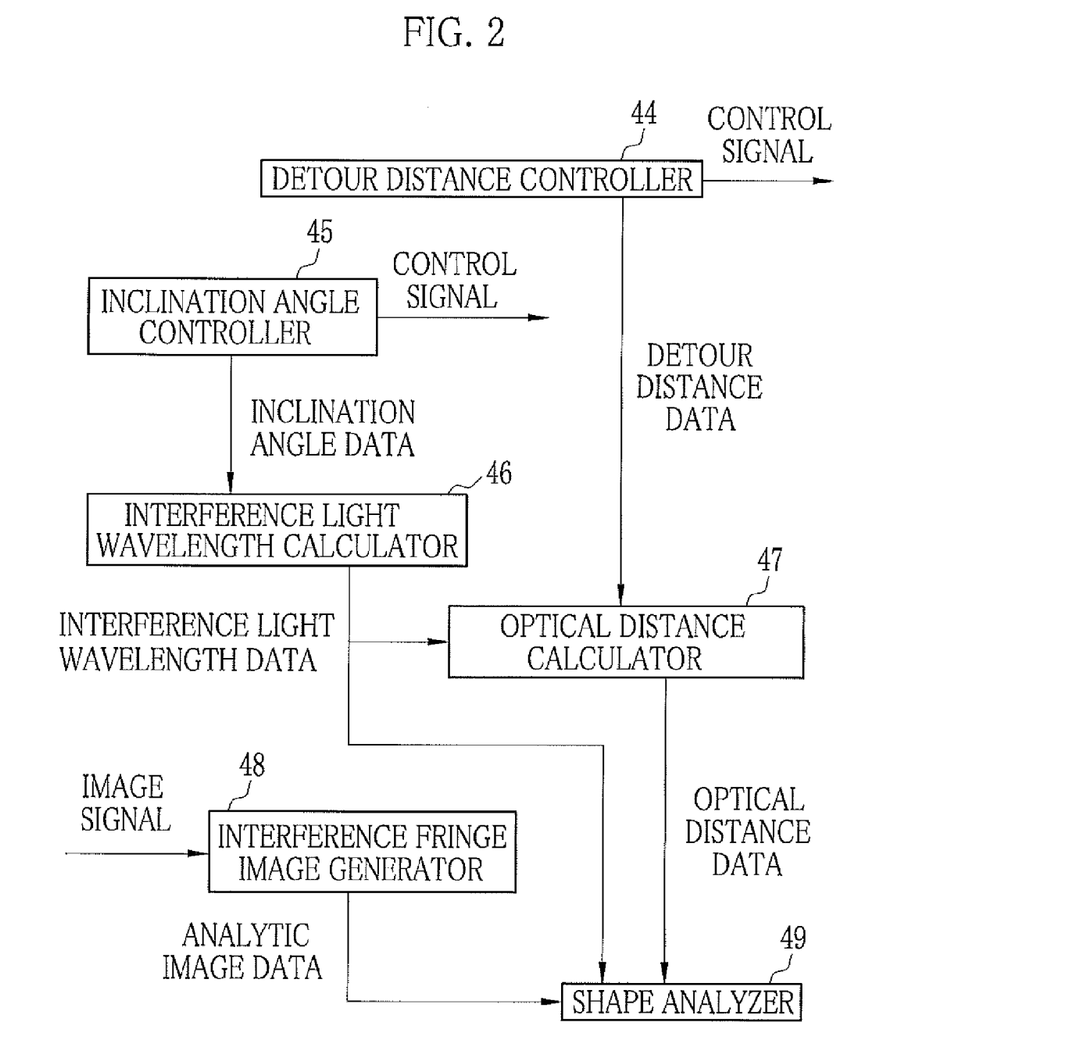
FIG. 2 is a block diagram of an analysis control device of the first embodiment.

The analysis control unit 40 is provided with an analysis control device 41, a monitor device 42, and an input device 43. The analysis control device 41 is composed of a computer or the like. The monitor device 42 displays an interference fringe image or the like. The input device 43 is used for performing various input operations to the analysis control device 41. As shown in FIG. 2. the analysis control device 41 includes a detour distance controller 44, an inclination angle controller 45, an interference light wavelength calculator 46, an optical distance calculator 47, an interference fringe image generator 48, and a shape analyzer 49 that are constituted of a CPU installed in the computer, a storage unit such as a hard disk, and a program stored in the storage unit, and the like.

The detour distance controller 44 controls the movable mirror position adjuster 17 (see FIG. 1) to increase or decrease the detour distance of the first flux relative to the second flux.

The inclination angle controller 45 outputs a control signal to control the inclination-angle adjusting mechanism (not shown) that supports the diffraction grating plate 24 (see FIG. 1), to adjust the inclination angle of the diffraction grating plate 24. The interference light wavelength calculator 46 calculates the wavelength of the interference light based on the inclination angle of the diffraction grating plate 24. Based on the detour distance and the wavelength of the interference light, the optical distance calculator 47 calculates an optical distance between the reference surface 31a and the sample surface 71 along an optical path of the measuring light. Based on an image signal obtained by the imaging camera 28 (see FIG. 1), the interference fringe image generator 48 generates an interference fringe image (hereinafter referred to as an analytic interference fringe image) that is used for shape analysis of the sample surface 71. The shape analyzer 49 performs shape analysis of the sample surface 71 based on the analytic interference fringe image and the optical distance.

In this embodiment, for example, the detour distance controller 44 and the movable mirror position adjuster 17 constitute a detour distance adjuster. For example, the interference light wavelength calculator 46 and the color separation optical system 22 constitute a wavelength analyzer. For example, the detour distance controller 44, the movable mirror position adjuster 17, the interference light wavelength calculator 46, the color separation optical system 22, the detour section 13, and the optical distance calculator 47 constitute an optical distance measuring section.

Hereinafter, an operation of the apparatus for measuring a rotationally symmetric aspheric surface according to the first embodiment is described. A diffraction angle of the diffractive optical element 32 relative to a wavelength of the measuring light is known in advance. Prior to the measurement, alignment of the optical deflection element 30 and the sample lens 70 is performed. Alignment steps will be described later. Here, an operation after the alignment is described.

(Operation of the Apparatus for Measuring a Rotationally Symmetric Aspheric Surface)

<1> After being outputted from the white light source 11 shown in FIG. 1, the low coherent light is collimated by the collimator lens 12 and then incident on the detour section 13.

<2> In the detour section 13, the low coherent light is divided into the first flux and the second flux at the beam splitting surface 14a of the beam splitter 14. The beam splitting surface 14a directs the first flux to the movable mirror 15 and the second flux to the fixed mirror 16. The first flux is retroreflected by the movable mirror 15. The second flux is retroreflected by the fixed mirror 16. The retroreflected first and second fluxes are recombined together at the beam splitting surface 14a. In this embodiment, an optical path length of the first flux is set longer than an optical path length of the second flux, when the splitting and recombination of the low coherent light.

<3> The recombined light outputted from the beam splitter 14 is incident on the beam splitter 20 through the beam diameter changing lens 19. The beam splitting surface 20a of the beam splitter 20 reflects and directs the incident light to the collimator lens 21. The collimator lens 21 collimates the incident light and then outputs the collimated light to the optical deflection element 30.

<4> The light incident on the optical deflection element 30 is divided into two fluxes at the reference surface 31a of the reference standard plate 31. One of the two fluxes is retroreflected by the reference surface 31a. The other flux passes through the reference surface 31a. In this embodiment, of the retroreflected light, a light component which has traveled a path of the first flux is used as the reference light. The flux passed through the reference surface 31a is used as the measuring light.

<5> The measuring light passed through the reference surface 31a is incident on the diffractive optical element 32, and then diffracted and deflected by the diffractive optical element 32. In this embodiment, out of the measuring light diffracted by the diffractive optical element 32, a zero-order diffracted light and positive and negative first-order diffracted lights are used as the measuring light to be emitted to the sample surface 71. The zero-order diffracted light is used for measuring a top portion and a projected region perpendicular to the optical axis $C_{70}$ on the sample surface 71.

Where the light outputted from the white light source 11 is in a wavelength range from 400 nm to 800 nm, and a diffraction angle $\theta_1$ of positive and negative second-order diffracted lights from the diffractive optical element 32 is set to 75 degrees relative to a wavelength component $\lambda$=800 nm, a grating pitch "d" of the diffractive optical element 32 is obtained from an expression $2d \cdot \sin \theta_1 = 2\lambda$, that is, d=828 nm. A diffraction angle $\theta_2$ of the positive and negative second-order diffracted lights of a wavelength component of 400 nm is obtained from an expression $\theta_2 = \sin^{-1}(400/828)$, that is, $\theta_2$=28.9 degrees. On the other hand, a diffraction angle $\theta_3$ of positive and negative first-order diffracted lights is obtained from an expression $2d \cdot \sin \theta_3 = \lambda$. When $\lambda$=400 nm, $\theta_3$=14 degrees. When $\lambda$=800 nm, $\theta_3$=28.9 degrees. In other words, when the positive and negative first and second-order diffracted lights are used as the measuring lights, the measuring lights are emitted in an angle range from 14 degrees to 75 degrees.

<6> Out of the measuring lights emitted to each region on the sample surface 71, the measuring lights perpendicularly incident on the sample surface 71 are retroreflected to the diffractive optical element 32, and then diffracted and deflected by the diffractive optical element 32. Thus, the measuring light returns to the reference surface 31a. In this embodiment, out of the measuring light passing through the reference surface 31a again in an upward direction, a light component which has traveled a path of the second flux is referred to as a sample light.

<7> The sample light is combined with the reference light at the reference surface 31a. Thereby, the interference light is formed. The interference light is incident on the collimator lens 23 of the color separation optical system 22 through the collimator lens 21 and the beam splitter 20. The collimator lens 23 collimates the interference light, and then the collimated interference light is incident on the diffraction grating plate 24.

<8> The interference light incident on the diffraction grating plate 24 is diffracted and deflected by a predetermined angle in accordance with the wavelength, and then is incident on the converging lens 25. In this embodiment, out of the light diffracted by the diffraction grating plate 24, the positive first-order diffracted light is used by way of an example. The interference light is converged through the converging lens 25 and then outputted to the pinhole plate 26.

<9> Out of the interference light outputted to the pinhole plate 26, only the interference light with the predetermined wavelength outputted in the direction of the optical axis $C_{25}$ of the converging lens 25 passes through the pinhole 26a, and then is incident on the imaging lens 27. Thereby, the imaging lens 27 forms an image on the image sensor 29 of the imaging camera 28. Note that the inclination angle controller 45 sets the inclination angle of the diffraction grating plate 24 to a predetermined value in advance.

<10> The interference light incident on the imaging camera 28 does not always form an interference fringe image on the image sensor 29. When an optical path difference between the reference light and the sample light, namely, when the optical path difference of the reference light (traveling from the white light source 11, through the collimator lens 12, the beam splitting surface 14a, the movable mirror 15, the beam splitting surface 14a, the beam diameter changing lens 19, the beam splitting surface 20a, and the collimator lens 21, to the reference surface 31a in this order in FIG. 1) and the optical path length of the sample light that is the measuring light (traveling from the white light source 11, through the collimator lens 12, the beam splitting surface 14a, the fixed mirror 16, the beam splitting surface 14a, the beam diameter changing lens 19, the beam splitting surface 20a, the collimator lens 21, the reference surface 31a, the diffractive optical element 32, the sample surface 71, and the diffractive optical element 32 to the reference surface 31a in this order in FIG. 1) is longer than a coherence length of the low coherent light from the white light source 11, the interference of the reference light and sample light does not occur. As a result, an interference fringe image is not formed.

On the other hand, when the detour distance of the first flux is adjusted in the detour section 13 relative to the second flux so as to set the optical path difference between the reference light and the sample light to be equal to or smaller than the coherence length, the interference of the reference light and the sample light occurs. Thereby, an interference fringe image is formed. The interference fringe image corresponds to a region on the sample surface 71, on which the measuring light is perpendicularly incident and from which the incident measuring light is retroreflected or reflected back as the sample light. The interference fringe image has a narrow-annular shape. The imaging camera 28 takes the interference fringe image and outputs an image signal of the interference fringe image to the interference fringe image generator 48. To adjust the detour distance, the detour distance controller 44 outputs a control signal to control the movable mirror position adjuster 17, to adjust the position of the movable mirror 15.

<11> The interference fringe image generator 48 generates the analytic interference fringe image from the image signal inputted thereto. Image data (analytic image data) of the analytic interference fringe image is inputted to the shape analyzer 49.

<12> Data of an inclination angle of the diffraction grating plate 24 at the time of taking the interference fringe image is inputted from the inclination angle controller 45 to the interference light wavelength calculator 46. Based on the inclination angle data, the interference light wavelength calculator 46 calculates the wavelength of the interference light. The wavelength data (interference light wavelength data) is inputted to the optical distance calculator 47 and the shape analyzer 49.

<13> Detour distance data at the time of taking the interference fringe image is inputted from the detour distance controller 44 to the optical distance calculator 47. Based on the detour distance data and the above-described interference light wavelength data, the optical distance calculator 47 calculates an optical distance between the reference surface 31a and the sample surface 71 (to be more exact, a region from which the sample light for forming the interference fringe image is retroreflected) along the optical path of the measuring light. To be more specific, the optical path length of the measuring light, which is to be reflected back as the sample light, traveling from the reference surface 31a through the diffractive optical element 32 to the sample surface 71 and reflected from the sample surface 71 through the diffractive optical element 32 back to the reference surface 31a coincides with the detour distance of the first flux relative to the second flux in the detour section 13. Accordingly, with the use of this detour distance data, the optical distance between the reference surface 31a and the sample surface 71 along the optical path of the measuring light is calculated. Data of the optical distance (optical distance data) is inputted to the shape analyzer 49.

<14> The shape analyzer 49 performs analysis based on the analytic image data, the interference light wavelength data, and the optical distance data inputted thereto. Thereby, the shape data of the sample surface 71 is obtained.

Next, a method for aligning the optical deflection element 30 and the sample lens 70 is described. For the alignment, in the following steps <2> and <3>, the zero-order diffracted light outputted from the diffractive optical element 32 is used as the measuring light, so it is not necessary to make a setting of the wavelength of the measuring light. In a step <4>, however, it is necessary to make the wavelength setting of the measuring light because the positive and negative first-order diffracted lights are used as the measuring light. Here, the wavelength setting of the measuring light is made in a step <1>. Alternatively, the wavelength setting may be made in the step <4>. The alignment is performed using alignment mechanisms (not shown) supporting the optical deflection element 30 and the sample lens 70, respectively.

(Alignment Steps)

<1> An output light from the interferometer 10 is set to a predetermined wavelength, for example, 632.8 nm, for use in the alignment. In this embodiment, the inclination angle of the diffraction grating plate 24 is set in accordance with the above wavelength. Namely, the inclination angle is set such that the interference light of the predetermined wavelength is diffracted and deflected by the diffraction grating plate 24 so as to be outputted in the direction of the optical axis $C_{25}$ of the converging lens 25. Thus, the wavelength of the interference light is set.

<2> In the absence of the sample lens 70, a tilt of the optical deflection element 30 is adjusted such that the reference surface 31a and the optical axis $C_{10}$ are perpendicular to each other. To adjust the tilt, a corner reflector or corner cube (not shown) is disposed on an optical path below the optical deflection element 30 in FIG. 1. The output light (collimated light) is applied from the interferometer 10 to the optical deflection element 30. A part of the output light is retroreflected as the reference light from the reference surface 31a. The remaining light passes through and is diffracted by the diffractive optical element 32. Out of the light passing through the diffractive optical element 32, a zero-order diffracted light is applied as the measuring light to the corner cube. The measuring light is reflected as an alignment light from the corner cube and interferes with the reference light in the optical deflection element 30. The tilt is adjusted such that an image of the interference fringe image becomes most similar to a null fringe pattern. The interference fringe image is only formed when an optical path difference between the reference light and the alignment light is equal to or smaller than a coherence length of the low coherent light outputted from the white light source 11. To satisfy the above condition, the detour distance of the first flux is adjusted relative to the second flux in the detour section 13.

<3> After the corner cube is removed, the sample lens 70 is disposed on the optical path. The tilt of the sample lens 70 is adjusted such that the optical axis $C_{70}$ of the sample lens 70 is parallel to the optical axis $C_{10}$. To adjust the tilt, the measuring light is applied to the sample lens 70 through the optical deflection element 30 such that the interference fringe image, formed by the reference light retroreflected from the reference surface 31a and the measuring light (the zero-order diffracted light) reflected back from the sample lens 70, becomes most similar to the null fringe pattern. Here, to be more exact, the zero-order diffracted light is incident on and reflected from a region on the sample surface 71 perpendicular to the optical axis $C_{70}$, for example, a flat flange formed around the outer circumference of the sample lens 70, the top portion or the projected region of the lens surface. As with the alignment step <2>, the detour distance in the detour section 13 is adjusted so as to form the interference fringe image.

<4> Prior to the alignment, based on a diffraction angle (referred to as a reference diffraction angle) of the positive and negative first-order diffracted lights (measuring lights) outputted from the diffractive optical element 32 upon emission of the output light of the predetermined wavelength from the interferometer 10, a reference region on the sample surface 71 and a reference optical distance are obtained from design values of the sample lens 70. The reference region is an annular region about the optical axis $C_{70}$ on the sample surface 71 on which the measuring light of the reference diffraction angle is incident perpendicularly. The reference optical distance is an optical distance between the reference surface 31a and the sample surface 71 along the optical path of the measuring light, when the measuring light diffracted by the reference diffraction angle is incident on the reference region perpendicularly. The detour distance of the first flux relative to the second flux in the detour section 13 is adjusted to be twice as long as the reference optical distance.

<5> The position of the sample lens 70 relative to the optical deflection element 30 is adjusted in vertical and horizontal directions relative to the optical axis $C_{10}$. To adjust the position of the sample lens 70, the measuring light is emitted at the reference diffraction angle to the sample surface 71 through the optical deflection element 30 such that the reference light retroreflected from the reference surface 31a and the measuring light (sample light) reflected from the reference region on the sample surface 71 form an annular interference fringe image (hereinafter referred to as a reference interference fringe image), and the fringe contrast (or modulation) of the reference interference fringe image becomes maximum, and the reference interference fringe image becomes most similar to the null fringe pattern.

Following the above alignment steps, the optical deflection element 30 and the sample lens 70 are aligned with each other. Hereinafter, measurement steps performed by the apparatus for measuring a rotationally symmetric aspheric surface according to the present invention are described.

(Measurement Steps)

<1> For the measurement, a wavelength of the output light from the interferometer 10 is set to a value different from the above-described wavelength used for the alignment. In this embodiment, an inclination angle of the diffraction grating plate 24 is set to a value suitable for the wavelength of the output light used for the measurement. Namely, the inclination angle of the diffraction grating plate 24 is set so as to diffract and deflect the interference light, composed of the reference light and the reflected measuring light (sample light), in the direction of the optical axis $C_{25}$ of the converging lens 25. Thus, the wavelength of the interference light is set, which in turn sets the wavelength of the output light.

<2> Prior to the measurement, based on the diffraction angle of the positive or negative first-order diffracted light (measuring light), outputted from the diffractive optical element 32 upon application of the output light having the set wavelength, an annular measurement region about the optical axis $C_{70}$ and an ideal value of an optical distance (hereinafter may referred to as an ideal optical distance) are determined from the design values of the sample lens 70. The annular measurement region is a region on the sample surface 71 on which the measuring light is incident perpendicularly. The optical distance is a distance between the reference surface 31a and the annular measurement region along the optical path of the measuring light. In the detour section 13, the detour distance of the first flux relative to the second flux is set to a value twice as long as the ideal optical distance.

<3> Then, the detour distance is finely adjusted such that the fringe contrast of the interference fringe image (the annular interference fringe image corresponding to the annular measurement region) becomes maximum. Thereafter, the imaging camera 28 takes the interference fringe image formed after the fine adjustment.

<4> Based on the inclination angle data of the diffraction grating plate 24, the interference light wavelength calculator 46 calculates the wavelength of the interference light (the wavelength of the output light from the interferometer 10). Based on the calculated wavelength data and the detour distance data after the fine adjustment, an actual optical distance at the time of the measurement is calculated.

<5> Based on an image signal of the interference fringe image taken by the imaging camera 28, the interference fringe image generator 48 generates the analytic interference fringe image. The shape analyzer 49 analyzes the analytic interference fringe image. Thereby, the shape data of the sample surface 71 is obtained. To be more specific, based on a difference between the ideal optical distance and the actual optical distance at the time of the measurement, calculated by the optical distance calculator 47, a dimensional error in the annular measurement region from the design value of the sample surface 71 is obtained. Based on the number and the pattern of fringes in the analytic interference fringe image, a shape error (phase difference) in the annular measurement region on the sample surface 71 is obtained.

Each shape data corresponds to a region on the sample surface 71 from which the measuring beam is reflected back as the sample light to form the interference fringe image. By sequentially varying the wavelength of the measuring light and repeating the above-described steps for each of the varied wavelengths, a set of shape data corresponding to respective regions on the sample surface 71 is obtained. The set of shape data is put together to obtain the shape of the entire sample surface 71, that is, the shapes of all the regions from which the sample light of varied wavelengths are reflected back. The wavelengths of the sample light are different on a region-by-region basis.

Second Embodiment

Figure 3:
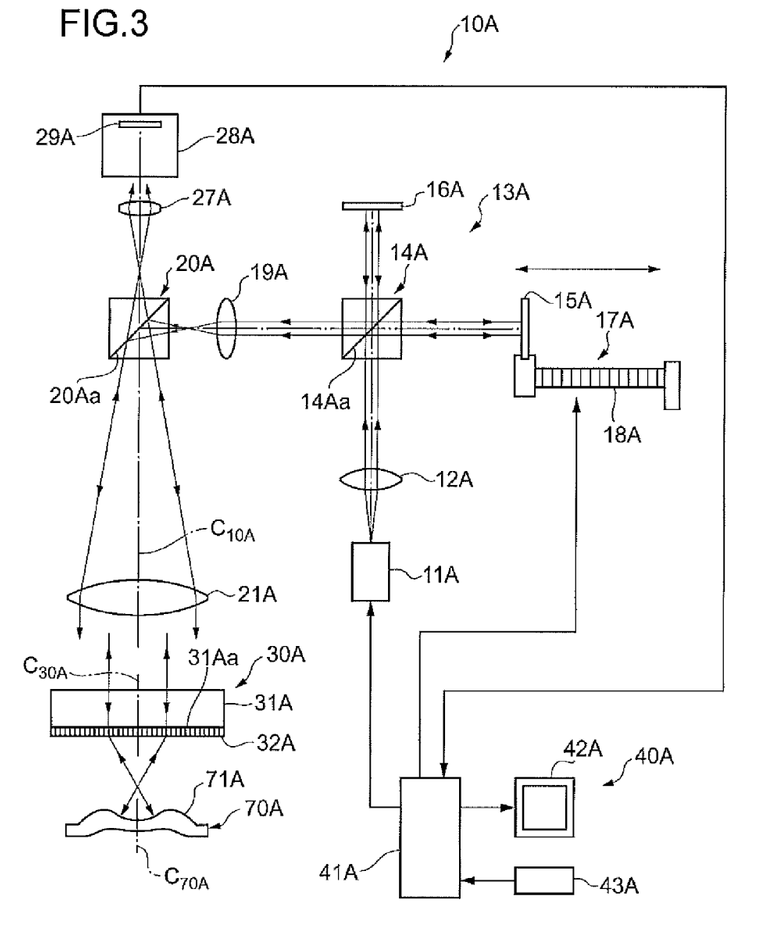
FIG. 3 is a schematic diagram of an apparatus for measuring a rotationally symmetric aspheric surface according to a second embodiment.

As shown in FIG. 3, an apparatus for measuring a rotationally symmetric aspheric surface according to a second embodiment is provided with an interferometer 10A, an optical deflection element 30A, and an analysis control unit 40A, and measures a shape of a sample surface 71A of a sample lens 70A. The sample surface 71A is an aspheric surface rotationally symmetric about an optical axis $C_{70A}$.

The interferometer 10A is provided with a wavelength-variable laser (laser beam source) 11A, a collimator lens 12A, a detour section 13A, a beam diameter changing lens 19A, a beam splitter 20A and a collimator lens 21A. A laser light beam outputted from the wavelength-variable laser beam source 11A is incident on the detour section 13A through the collimator lens 12A. The detour section 13A divides the incident laser beam into a first beam and a second beam, and makes one of the first and second beams travel a longer optical distance than the other by the detour distance and then recombines the first and second beams into a single laser beam. The recombined laser beam is outputted from the detour section 13A and then incident on the beam splitter 20A through the beam diameter changing lens 19A. A beam splitting surface 20Aa of the beam splitter 20A reflects the incident laser beam downward in FIG. 3. The collimator lens 12A collimates the laser beam incident thereon from the beam splitter 20A and then outputs the collimated laser beam in an optical axis $C_{10A}$ direction. The interferometer 10A is further provided with an imaging lens 27A and an imaging camera 28A to obtain an interference fringe image. The imaging camera 28A has an image sensor 29A such as a CCD or a CMOS.

The detour section 13A is provided with a beam splitter 14A, a movable mirror 15A, a fixed mirror 16A, and a movable mirror position adjuster 17A. A beam splitting surface 14Aa of the beam splitter 14A divides the laser beam incident thereon from the collimator lens 12A into a first beam and a second beam. The beam splitting surface 14Aa directs the first beam to the right and a second beam upward in FIG. 3. The movable mirror 15A is disposed on an optical path of the first beam outputted from the beam splitter 14A. The fixed mirror 16A is disposed on an optical path of the second beam outputted from the beam splitter 14A. The movable mirror position adjuster 17A has a PZT element 18A to move the movable mirror 15A in a side-to-side direction in FIG. 3. The detour section 13A makes the first beam travel a longer optical distance than the second beam by a predetermined detour distance, that is, a distance twice as long as a difference between an optical distance between the beam splitting surface 14Aa and the movable mirror 15A and an optical distance between the beam splitting surface 14Aa and the fixed mirror 16A. Thereafter, the first beam and the second beam are recombined together into a single light beam and the recombined light beam is outputted to the beam diameter changing lens 19A.

The optical deflection element 30A is composed of a reference standard plate 31A and a diffractive optical element 32A. The reference standard plate 31A is provided with a reference surface 31Aa perpendicular to its optical axis $C_{30A}$. The reference surface 31Aa divides the laser beam from the interferometer 10A into a reference beam to be retroreflected to the interferometer 10A and a measuring beam to be outputted through the diffractive optical element 32A. The diffractive optical element 32A is of a transmission type and has a diffraction grating. The diffraction grating is composed of annular areas formed concentrically about the optical axis $C_{30A}$. The diffractive optical element 32A diffracts and deflects the measuring beam by an angle determined by a wavelength of the measuring beam, and outputs the measuring beam to the sample surface 71A. The deflection angle varies with the wavelength of the measuring beam. The diffractive optical element 32A deflects a sample beam that is the measuring beam reflected back from the sample surface 71A, to be incident on the reference surface 31Aa. At the reference surface 31Aa, the sample beam and the reference beam are combined together into interference light. The interference light is outputted to the interferometer 10A.

For the measuring beam to be emitted to the sample surface 71A, normally, a positive or negative first-order diffracted beam outputted from the diffractive optical element 32A is used. In this specification, a beam outputted toward the optical axis $C_{30B}$ is referred to as a positive beam, and a beam outputted to be away from the optical axis $C_{30B}$ is referred to as a negative beam. Higher-order diffracted beams, such as positive and negative second-order diffracted beams and positive and negative third-order diffracted beams can be used as the measuring beams.

Figure 4:
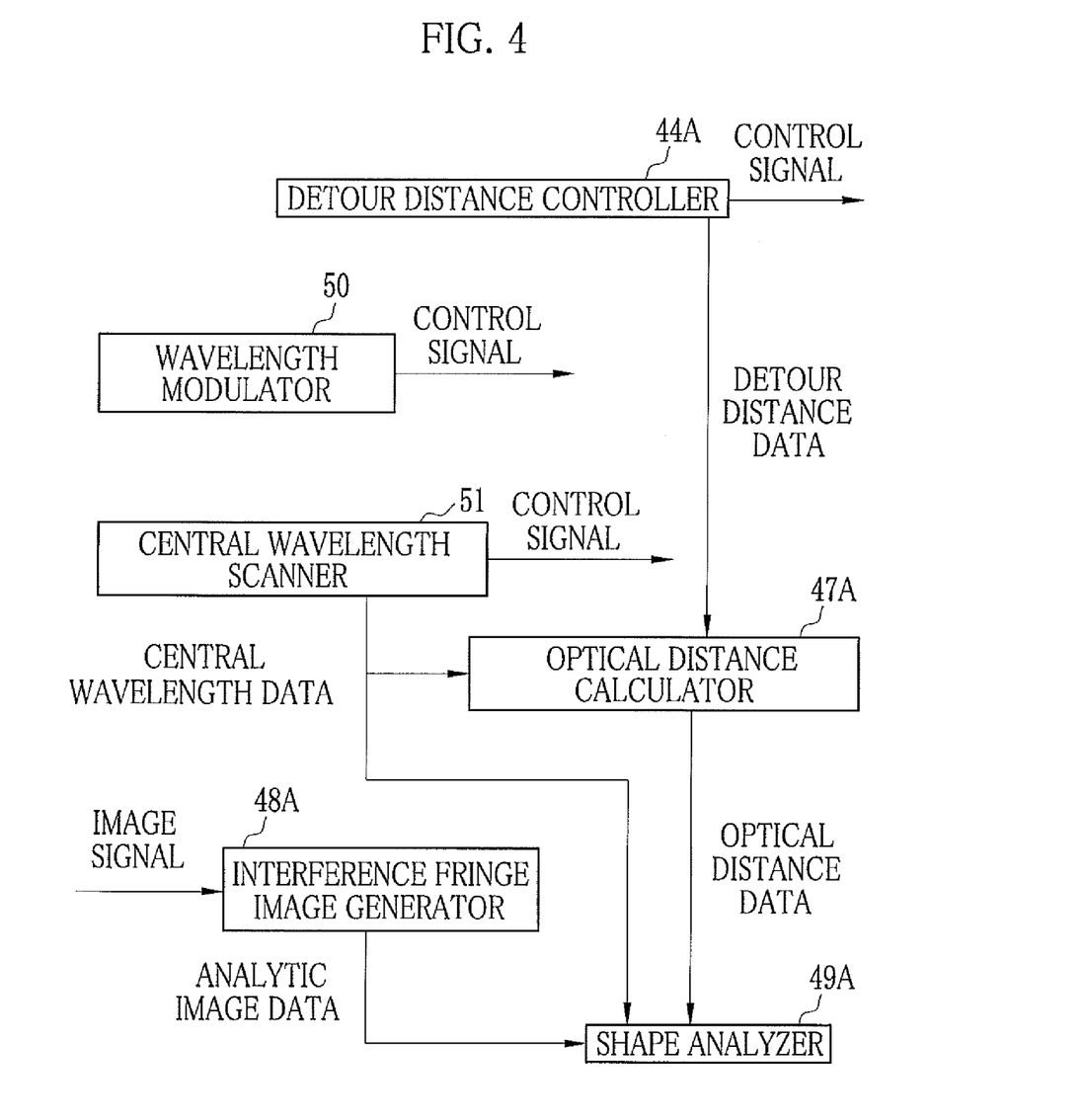
FIG. 4 is a block diagram of an analysis control device of the second embodiment.

The analysis control unit 40A is provided with an analysis control device 41A such as a computer, a monitor device 42A for displaying the interference fringe image and the like, and an input device 43A for performing various input operations to the analysis control device 41A. As shown in FIG. 4, the analysis control device 41A includes a detour distance controller 44A, a wavelength modulator 50, a central wavelength scanner 51, an optical distance calculator 47A, an interference fringe image generator 48A, and a shape analyzer 49A that are constituted of a CPU installed in the computer, a storage unit such as a hard disk, and a program stored in the storage unit, and the like.

The wavelength modulator 50 modulates the wavelength of the laser beam, outputted from the wavelength-variable laser beam source 11A, within a time shorter than a frame period of the imaging camera 28A (see FIG. 3) or charge accumulation time per frame of the image sensor 29A, such that the laser beam has the same coherence length as the low coherent light. The central wavelength scanner 51 varies or scans a central wavelength of the laser beam, outputted from the wavelength-variable laser beam source 11A, in a predetermined range (for example, from 200 nm to 400 nm).

Based on the detour distance and the central wavelength of the laser beam, the optical distance calculator 47A calculates an optical distance between the reference surface 31Aa and the sample surface 71A along an optical path of the measuring beam. Based on an image signal obtained by the imaging camera 28A, the interference fringe image generator 48A generates an interference fringe image (hereinafter referred to as an analytic interference fringe image) that is used for the shape analysis of the sample surface 71A. The shape analyzer 49A performs the shape analysis based on the analytic interference fringe image and the optical distance calculated as above.

In this embodiment, for example, the detour distance controller 44A and the movable mirror position adjuster 17A constitute the detour distance adjuster. For example, the detour distance controller 44A, the movable mirror position adjuster 17A, the detour section 13A, and the optical distance calculator 47A constitute the optical distance measuring section.

Hereinafter, an operation of the apparatus for measuring a rotationally symmetric aspheric surface according to the second embodiment is described. Note that a diffraction angle of the diffractive optical element 32A relative to the wavelength of the measuring beam is a known value. Before the measurement, the optical deflection element 30A and the sample lens 70A are aligned with each other relative to the optical axis $C_{10A}$. This alignment is performed using alignment mechanisms (not shown) supporting the optical deflection element 30A and the sample lens 70A, respectively. The alignment steps are similar to or the same as those in the first embodiment, so descriptions thereof are omitted. Note that in the first embodiment, the inclination angle of the diffraction grating plate 24 is changed to set the wavelength of the interference light. In this embodiment, on the other hand, a central wavelength of the laser beam, outputted from the wavelength-variable laser beam source 11A, is changed directly to set the wavelength of the interference light. Hereinafter, an operation of the measurement after the alignment is described.

(Measurement Operation)

<1> The wavelength-variable laser beam source 11A shown FIG. 3 emits a laser beam. During the emission, under the control of the wavelength modulator 50 (the wavelength modulator 50 outputs a control signal), the wavelength of the laser beam is modulated within a time shorter than the frame period of the imaging camera 28A or the charge accumulation time per frame of the image sensor 29A, such that the laser beam has the same coherence length as the low coherent light. A method for synthesizing a coherence function is presented, as a technique similar to the above, in "Proceedings of Meeting on Lightwave Sensing", May 1995, pages 75 to 82, for example. A technology improving this method has been patented (see Japanese Patent No. 3621693).

<2> Under the control of the central wavelength scanner 51 (the central wavelength scanner 51 outputs a control signal), the central wavelength of the laser beam outputted from the wavelength-variable laser beam source 11A is set to a predetermined value (for example, an upper limit of a wavelength variable range).

<3> The outputted laser beam is incident on the collimator lens 12A. The collimator lens 12A collimates the incident laser beam and then the collimated laser beam is incident on the detour section 13A.

<4> In the detour section 13A, the beam splitting surface 14Aa of the beam splitter 14A divides the incident laser beam into the first beam and the second beam. The beam splitting surface 14Aa directs the first beam to the movable mirror 15A and the second beam to the fixed mirror 16A. The first and second beams are retroreflected from the movable mirror 15A and the fixed mirror 16A, respectively, and then recombined together at the beam splitting surface 14Aa. In this embodiment, the optical path length of the first beam is set longer than the optical path length of the second beam, between the splitting and recombination of the laser beam.

<5> The recombined laser beam, outputted from the beam splitter 14A, is incident on the beam splitter 20A through the beam diameter changing lens 19A. The incident laser beam is reflected by the beam splitting surface 20Aa of the beam splitter 20A, and then incident on the collimator lens 21A. The collimator lens 21A collimates the incident laser beam and then outputs the collimated laser beam to the optical deflection element 30A.

<6> Upon incidence of the laser beam on the optical deflection element 30A, the reference surface 31Aa of the reference standard plate 31A divides the laser beam into a beam to be retroreflected thereby and a beam to be passed therethrough. In this embodiment, out of the beam retroreflected from the reference surface 31Aa, a beam component which has traveled along the path of the first beam is used as the reference beam. The beam which has passed through the reference surface 31Aa is used as the measuring beam.

<7> The measuring beam that has passed through the reference surface 31Aa is incident on the diffractive optical element 32A, and then diffracted and deflected by the diffractive optical element 32A. In this embodiment, out of the measuring beam diffracted by the diffractive optical element 32A, the zero-order diffracted beam and the positive and negative first-order diffracted beams are used for the measurement, and emitted to the sample surface 71. The zero-order diffracted beam is used for measuring a top portion and a projected region perpendicular to the optical axis $C_{70A}$ on the sample surface 71.

Where the laser beam outputted from the wavelength-variable laser beam source 11A is in a wavelength range from 400 nm to 800 nm, and a diffraction angle $\theta_1$ of positive and negative second-order diffracted beams from the diffractive optical element 32A is set to 75 degrees relative to a wavelength component $\lambda=800$ nm, a grating pitch "d" of the diffractive optical element 32A is obtained from an expression $2d \cdot \sin \theta_1 = 2\lambda$, that is, $d=828$ nm. A diffraction angle $\theta_2$ of the positive and negative second-order diffracted beams of a wavelength component of 400 nm is obtained from an expression $\theta_2 = \sin^{-1}(400/828)$, that is, $\theta_2=28.9$ degrees. On the other hand, a diffraction angle $\theta_3$ of the positive and negative first order diffracted beams is obtained from an expression $2d \cdot \sin \theta_3 = \lambda$. When $\lambda=400$ nm, $\theta_3=14$ degrees. When $\lambda=800$ nm, $\theta_3=28.9$ degrees. In other words, when the positive and negative first and second-order diffracted beams are used as the measuring beams, the measuring beams are emitted in an angle range from 14 degrees to 75 degrees.

<8> Out of the measuring beams emitted to each of the regions on the sample surface 71A, the measuring beam incident on the sample surface 71A perpendicularly is retroreflected to the diffractive optical element 32A. Then, the retroreflected beam is diffracted and deflected by the diffractive optical element 32A to return to the reference surface 31Aa of the reference standard plate 31A. In this embodiment, out of the retroreflected measuring beam passed through the reference surface 31Aa again, a beam component which has traveled along the path of the second beam is used as the sample beam.

<9> The sample beam and the reference beam are combined together into the interference light at the reference surface 31Aa. The interference light is incident on the imaging lens 27A through the collimator lens 21A and the beam splitter 20A to form an image on the image sensor 29A of the imaging camera 28A.

<10> It should be noted, however, that interference light incident on the imaging camera 28A does not always form an interference fringe image on the image sensor 29A. To be more specific, the reference beam and the sample beam constituting the interference light have the same coherence length as that of the low coherent light. Accordingly, when the optical path difference between the reference beam (traveling from the wavelength-variable laser beam source 11A, through the collimator lens 12A, the beam splitting surface 14Aa, the movable mirror 15A, the beam splitting surface 14Aa, the beam diameter changing lens 19A, the beam splitting surface 20Aa, and the collimator lens 21A, to the reference surface 31Aa in this order in FIG. 3) and the sample beam (traveling from the wavelength-variable laser beam source 11A, through the collimator lens 12A, the beam splitting surface 14Aa, the fixed mirror 16A, the beam splitting surface 14Aa, the beam diameter changing lens 19A, the beam splitting surface 20Aa, the collimator lens 21A, the reference surface 31Aa, the diffractive optical element 32A, the sample surface 71A, and the diffractive optical element 32A, to the reference surface 31Aa in this order in FIG. 3) is longer than the coherence length, the interference of the reference beam and the sample beam does not occur. Accordingly, the interference fringe image is not formed.

On the other hand, when the detour distance of the first beam is adjusted relative to the second beam in the detour section 13A such that the optical path difference between the reference beam and the sample beam is equal to or less than the coherence length of the low coherent light, the interference of the reference beam and the sample beam occurs. Thereby, the interference fringe image is formed. This interference fringe image corresponds to the narrow annular region on the sample surface 71A on which the measuring beam is incident perpendicularly and from which the sample beam is retroreflected. The interference fringe image is taken by the imaging camera 28A, and then the image signal of the interference fringe image is outputted to the interference fringe image generator 48A. To increase or decrease the detour distance, the detour distance controller 44A outputs a control signal to control the movable mirror position adjuster 17A, to adjust the position of the movable mirror 15A.

<11> The interference fringe image generator 48A generates the analytic interference fringe image based on the image signal inputted thereto. The image data of the analytic interference fringe image (analytic image data) is inputted to the shape analyzer 49A.

<12> To the optical distance calculator 47A and the shape analyzer 49A, the central wavelength scanner 51 inputs central wavelength data of the laser beam obtained at the time of taking the interference fringe image. To the optical distance calculator 47A, the detour distance controller 44A inputs the detour distance data obtained at the time of taking the interference fringe image. Based on the detour distance data and the central wavelength data, the optical distance calculator 47A calculates the optical distance from the reference surface 31Aa to the sample surface 71A (to be exact, the region from which the sample beam for forming the interference fringe image is reflected back) along the optical path of the measuring beam. Specifically, the total optical path length of the measuring beam from the reference surface 31Aa to the sample surface 71A through the diffractive optical element 32A and from the sample surface 71A back to the reference surface 31Aa through the diffractive optical element 32A is equivalent to the detour distance of the first beam in the detour section 13A. Accordingly, based on the detour distance data, the optical distance between the reference surface 32Aa and the sample surface 71A along the optical path of the measuring beam is calculated. The optical distance data is inputted to the shape analyzer 49A.

<13> The shape analyzer 49A performs the analysis to obtain the shape data of the sample surface 71A based on the analytic image data, the central wavelength data, and the optical distance data inputted thereto. The shape data corresponds to a predetermined region on the sample surface 71A from which the sample beam (measuring beam) is retroreflected back. The sample beam and the reference beam form the interference fringe image. Under the control of the central wavelength scanner 51, the above-described steps are repeated while the central wavelength of the laser beam outputted from the wavelength-variable laser beam source 11A is varied or scanned. Thereby, a set of shape data respectively corresponding to the regions on the entire sample surface 71A is obtained. The set of shape data is put together to obtain the shape of the entire sample surface 71A, that is, the shapes of all the regions on the sample surface 71A from which the sample beams (measuring beams) are retroreflected. The central wavelengths of the sample beam are different on a region-by-region basis. A specific method for obtaining the shape data of the sample surface 71A is similar to or the same as that of the first embodiment, so the descriptions thereof are omitted.

Third Embodiment

Figure 5:
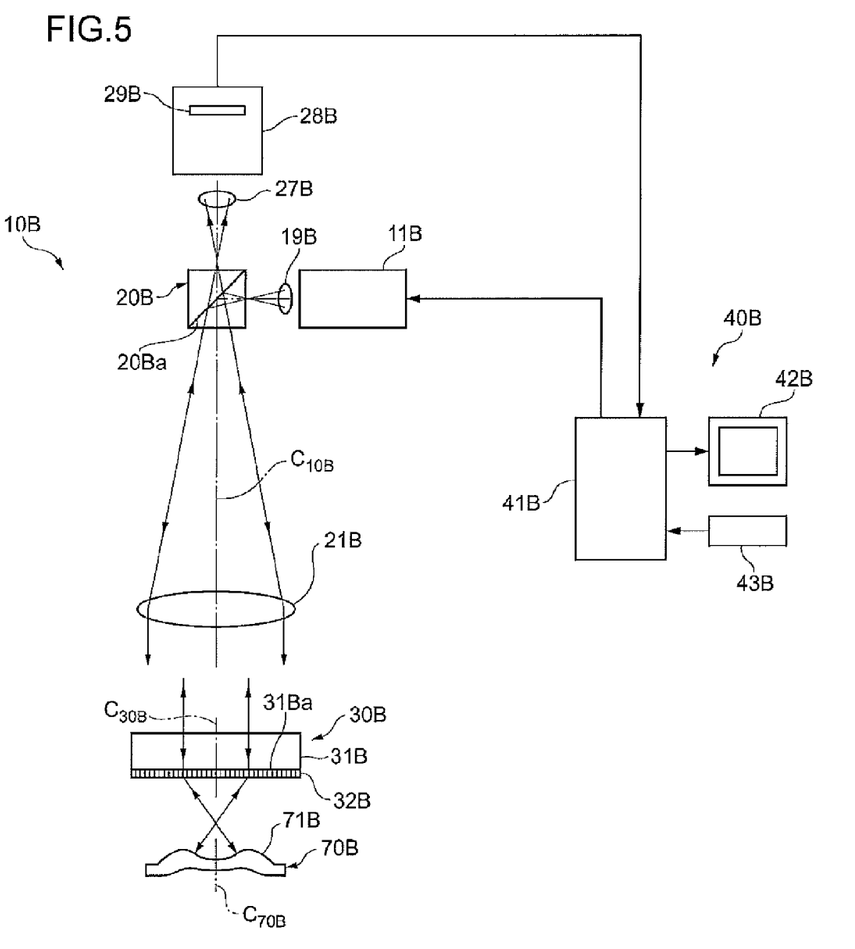
FIG. 5 is a schematic diagram of an apparatus for measuring a rotationally symmetric aspheric surface according to a third embodiment.

As shown in FIG. 5, an apparatus for measuring a rotationally symmetric aspheric surface according to a third embodiment is provided with an interferometer 10B, an optical deflection element 30B, and an analysis control unit 40B, and measures a shape of a sample surface 71B of a sample lens 70B. The sample surface 71B is an aspheric surface rotationally symmetric about an optical axis $C_{70B}$.

The interferometer 10B is provided with a wavelength-variable laser beam source 11B, a beam diameter changing lens 19B, a beam splitter 20B, and a collimator lens 21B. An output laser beam from the wavelength-variable laser beam source 11B is incident on the beam splitter 20B through the beam diameter changing lens 19B. A beam splitting surface 20Ba of the beam splitter 20B reflects the incident laser beam downward in FIG. 5. The collimator lens 21B collimates the laser beam incident thereon from the beam splitter 20B, and then outputs the collimated laser beam along an optical axis $C_{10B}$. The interferometer 10B is further provided with an imaging lens 27B and an imaging camera 28B to obtain an interference fringe image. The imaging camera 28B has an image sensor 29B such as a CCD or a CMOS.

The optical deflection element 30B is composed of a reference standard plate 31B and a diffractive optical element 32B. The reference standard plate 31B is provided with a reference surface 31Ba perpendicular to an optical axis $C_{30B}$. The reference surface 31Ba divides the output light beam from the interferometer 10B into two beams. The reference surface 31Ba retroreflects one of the two beams as a reference beam to the interferometer 10B, and transmits the other beam as a measuring beam to the diffractive optical element 32B. The diffractive optical element 32B is of a transmission type and has a diffraction grating. The diffraction grating is composed of annular areas formed concentrically about the optical axis $C_{30B}$. The diffractive optical element 32B diffracts and deflects the measuring beam, outputted from the reference surface 31Ba, by an angle determined by a wavelength of the measuring beam, and applies the measuring beam to the sample surface 71B. Note that the deflection angle of the measuring beam vary with its wavelength. The diffractive optical element 32B deflects a sample beam that is the measuring beam reflected back from the sample surface 71B, to be incident on the reference surface 31Ba. The reference beam and the sample beam are combined together into interference light at the reference surface 31Ba. The interference light is outputted to the interferometer 10B.

For the measuring beam to be emitted to the sample surface 71B, generally, a positive or negative first-order diffracted beam outputted from the diffractive optical element 32B is used. In this specification, a beam outputted toward the optical axis $C_{30B}$ is referred to as a positive beam, and a beam outputted away from the optical axis $C_{30B}$ is referred to as a negative beam. Higher-order diffracted beams, such as positive and negative second-order diffracted beams and positive and negative third-order diffracted beams can be used as the measuring beams.

Figure 6:
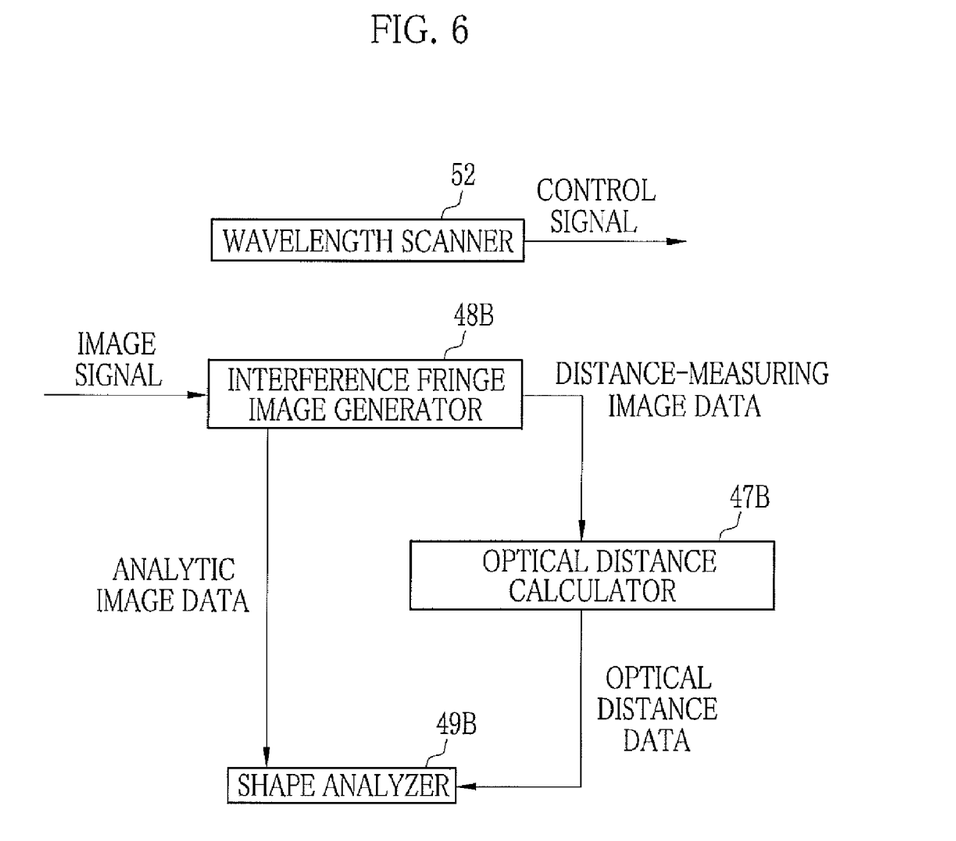
FIG. 6 is a block diagram of an analysis control device of the third embodiment.

The analysis control unit 40B is provided with an analysis control device 41B such as a computer, a monitor device 42B for displaying the interference fringe image and the like, and an input device 43B for performing various input operations to the analysis control device 41B. As shown in FIG. 6, the analysis control device 41B includes a wavelength scanner 52, an interference fringe image generator 48B, an optical distance calculator 47B, and a shape analyzer 49B that are constituted of a CPU installed in the computer, a storage unit such as a hard disk, and a program stored in the storage unit, and the like.

The wavelength scanner 52 varies or scans the wavelength of the laser beam outputted from the wavelength-variable laser beam source 11B in a predetermined range (for example, from 200 nm to 400 nm).

While the wavelength scanner 52 varies or scans the wavelength of the laser beam outputted from the wavelength-variable laser beam source 11B, the interference fringe image generator 48B sequentially generates "interference fringe images for distance measuring" and "analytic interference fringe images" based on image signals obtained sequentially by the imaging camera 28B. The interference fringe images for distance measuring are used for calculating an optical distance between a reference surface 30Ba and the sample surface 71B along an optical path of the measuring beam. The analytic interference fringe images are used for the shape analysis of the sample surface 71B.

The optical distance calculator 47B calculates the optical distance between the reference surface 31Ba and the sample surface 71B along the optical path of the measuring beam based on the number of times of changes in the interference fringes in a predetermined pixel of the interference fringe images for distance measuring.

The shape analyzer 49B performs the shape analysis of the sample surface 71A based on the analytic interference fringe image and the optical distance.

In this embodiment, for example, the wavelength scanner 52 and the optical distance calculator 47B constitute an optical distance measuring section.

Hereinafter, an operation of the apparatus for measuring a rotationally symmetric aspheric surface according to the third embodiment is described. Note that a diffraction angle of the diffractive optical element 32B relative to a wavelength of the measuring beam is a known value. Before the measurement, the optical deflection element 30B and the sample lens 70B are aligned with each other relative to the optical axis $C_{10B}$. This alignment is performed using alignment mechanisms (not shown) supporting the optical deflection element 30B and the sample lens 70A, respectively. The alignment steps are similar to or the same as those in the second embodiment, so descriptions thereof are omitted. Note that the second embodiment requires the adjustment of the detour distance in the detour section 13A. This embodiment, on the other hand, eliminates the need for the adjustment of the detour distance. Hereinafter, an operation of the measurement after the alignment is described.

(Measurement Operation)

<1> The wavelength-variable laser beam source 11B shown in FIG. 5 outputs a laser beam. The laser beam is incident on the collimator lens 21B through the beam diameter changing lens 19B and the beam splitter 20B. The beam splitting surface 20Ba of the beam splitter 20B reflects the laser beam downward in FIG. 5. The collimator lens 21B collimates the incident laser beam and then outputs the collimated laser beam to the optical deflection element 30B.

<2> The collimated laser beam incident on the optical deflection element 30B is divided into two beams at the reference surface 31Ba of the reference standard plate 31B. One of the two beams is retroreflected by the reference surface 31Ba as the reference beam to the collimator lens 21B. The other beam that is the measuring beam parallel to the optical axis $C_{10B}$ is incident on the diffractive optical element 32B. The measuring beam is diffracted and deflected by the diffractive optical element 32B. In this embodiment, out of the measuring beams diffracted by the diffractive optical element 32B, a zero-order diffracted beam and positive and negative first-order diffracted beams are used as the measuring beams to be incident on the sample surface 71B. The zero-order diffracted beam is used for measuring regions such as a top portion and a projected region perpendicular to the optical axis $C_{70B}$ on the sample surface 71B.

Where the laser beam outputted from the wavelength-variable laser beam source 11B is in a wavelength range from 400 nm to 800 nm, and a diffraction angle $\theta_1$ of positive and negative second-order diffracted beams from the diffractive optical element 32B is set to 75 degrees relative to a wavelength component $\lambda=800$ nm, a grating pitch "d" of the diffractive optical element 32B is obtained from an expression $2d \sin \theta_1 = 2\lambda$, that is, d=828 nm. A diffraction angle $\theta_2$ of the positive and negative second-order diffracted beams of a wavelength component of 400 nm is obtained from an expression $\theta_2 = \sin^{-1}(400/828)$, that is, $\theta_2 = 28.9$ degrees. On the other hand, a diffraction angle $\theta_3$ of the positive and negative first order diffracted beams is obtained from an expression $2d \sin \theta_3 = \lambda$. When $\lambda=400$ nm, $\theta_3=14$ degrees. When $\lambda=800$ nm, $\theta_3=28.9$ degrees. In other words, when the positive and negative first and second-order diffracted beams are used as the measuring beams, the measuring beams are applied to an angle range from 14 degrees to 75 degrees.

<3> Of the measuring beams emitted to each region on the sample surface 71B, the measuring beam incident on the sample surface 71B perpendicularly is retroreflected as the sample beam to the diffractive optical element 32B. The sample beam is diffracted and deflected by the diffractive optical element 32 to return the reference surface 31Ba of the reference standard plate 31B.

<4> The sample beam and the reference beam are combined into the interference light at the reference surface 31Ba. The interference light is incident on the imaging lens 27B through the collimator lens 21B and the beam splitter 20B, and thus forms the interference fringe image on the image sensor 29B of the imaging camera 28B.

<5> To calculate the optical distance between the reference surface 31Ba and the sample surface 71B, the wavelength of the laser beam outputted from the wavelength-variable laser beam source 11B is varied or scanned in the predetermined wavelength range under the control of the wavelength scanner 52 when the interference fringe image is formed.

<6> While the wavelengths of the laser beam are varied or scanned, the imaging camera 28B takes the interference fringe images sequentially at predetermined timing. An image signal of each of the interference fringe images is outputted as a video signal. The interference fringe image generator 48B generates the interference fringe image for distance measuring from the video signal. The image data of the interference fringe image for distance measuring (distance-measuring image data) is then outputted to the optical distance calculator 47B.

<7> The optical distance calculator 47B obtains the number of times of changes in a predetermined pixel of the interference fringe images for distance measuring. Based on the number of times, the optical distance between the reference surface 31Ba and the sample surface 71B along the optical path of the measuring beam is calculated based on the interference light (laser beam) on the wavelength-by-wavelength basis. The calculation of the optical distance is performed through the following mathematical expressions.

When the wavelength of the laser beam outputted from the wavelength-variable laser beam source 11B is varied or scanned from "$k_1$" to "$k_2$", and the interference fringe image is taken every "$\Delta k$", a change "$I(x, y, k)$" in interference fringe intensity is expressed by an expression (1).

$$I(x,y,k)=I_0(x,y)\{1+\gamma \cos [kL(x,y)]\} \quad (1)$$

Here, "$L(x, y)$" represents an optical path difference between the sample beam and the reference beam. "$I_0(x, y)$" represents intensity distribution. "$\gamma$" represents interference fringe modulation. When the number of times of the changes in the predetermined pixel in the interference fringe images is "n", an expression (2) is satisfied.

$$(k_2-k_1)L=2\pi n \quad (2)$$

Here, $k=2\pi/\lambda$ leads to an expression (3).

$$L=2\pi n/(k_2-k_1)=n\lambda_1\lambda_2/(\lambda_1-\lambda_2) \quad (3)$$

By obtaining the number of times of changes in the interference fringes in the predetermined pixel, that is, a frequency "n" of changes in the interference fringes by a scan of the wavelength, an optical path difference between the sample beam and the reference beam is calculated. The details of the method are disclosed in Japanese Patent No. 4100663.

In this embodiment, the calculated optical path difference between the sample beam and the reference beam is twice as long as the optical distance between the reference surface 31Ba and the sample surface 71B through the diffractive optical element 32B along the optical path of the measuring beam. Thus, the optical distance between the reference surface 31Ba and the sample surface 71B along the optical path of the measuring beam is calculated.

<8> The interference fringe image generator 48B generates the analytic interference fringe images on a wavelength-by-wavelength basis of the interference beam (laser beam) to perform the shape analysis of the sample surface 71B. The analytic image data of the analytic interference fringe images is outputted to the shape analyzer 49B.

<9> The shape analyzer 49B analyzes the analytic image data, generated on a wavelength-by-wavelength basis, and the optical distance data. Thereby, each of shape data of the sample surface 71B is obtained. Each shape data corresponds to an annular measurement region on the sample surface 71B from which the measuring beam with a predetermined wavelength is reflected back. A set of the shape data is put together to obtain the entire shape of the sample surface 71B, that is, the shapes of all the regions from which the measuring beams of respective wavelengths are reflected back. The wavelengths of the reflected measuring beam are different on a region-by-region basis. A specific method for obtaining the shape data of the sample surface 71B is similar to or the same as that of the first embodiment, so descriptions thereof are omitted.

Fourth Embodiment

Figure 7:
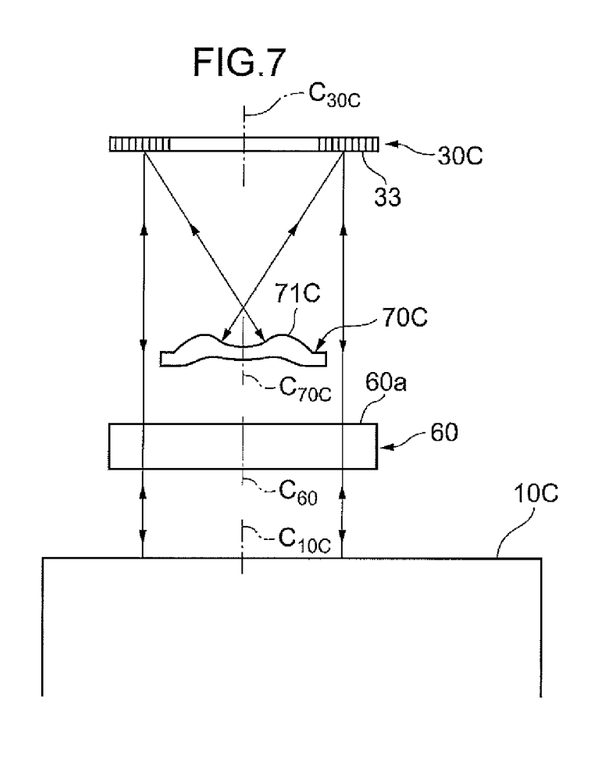
FIG. 7 is a schematic diagram of an apparatus for measuring a rotationally symmetric aspheric surface according to a fourth embodiment.

As shown in FIG. 7, an apparatus for measuring a rotationally symmetric aspheric surface according to a fourth embodiment is provided with an interferometer 10C (with an optical axis $C_{10C}$), a transmissive reference standard plate 60 (with an optical axis $C_{60}$), and an optical deflection element 30C (with an optical axis $C_{30C}$), and measures a shape of a sample surface 71C of a sample lens 70C. The sample surface 71C is an aspheric surface rotationally symmetric about an optical axis $C_{70C}$.

The interferometer 10C is similar to or the same as the interferometer 10 of the first embodiment, the interferometer 10A of the second embodiment, or the interferometer 10B of the third embodiment. The interferometer 10C is provided with an analysis control unit (not shown) similar to or the same as the analysis control unit 40 of the first embodiment, the analysis control unit 40A of the second embodiment, or the analysis control unit 40B of the third embodiment.

A reference standard plate 60 has a reference surface 60a perpendicular to the optical axis $C_{60}$. The reference surface 60a retroreflects a part of the output light, from the interferometer 10C, as a reference light. The remaining light is outputted as a measuring light to the optical deflection element 30C.

The optical deflection element 30C is a reflecting-type diffractive optical element and has a reflecting-type diffraction grating 33. The diffraction grating 33 is composed of annular areas formed concentrically about the optical axis $C_{30C}$. The optical deflection element 30C diffracts and deflects the incident measuring light by an angle determined by a wavelength of the measuring light, and outputs the measuring light to the sample surface 71C. The optical deflection element 30C diffracts and deflects incident sample light reflected back from the sample surface 71C, and outputs the sample light to the reference standard plate 60. An operation of this embodiment is similar to or the same as that in the above-described first and third embodiments, so the descriptions are omitted.

The embodiments of the present invention are detailed as above. The present invention, however, is not limited to the above embodiments. Various changes and modifications are possible in the present invention and may be understood to be within the present invention.

For example, in the above-described optical deflection element 30, the reference standard plate 31 and the diffractive optical element 32 may be provided separately. In the optical deflection element 30A, the reference standard plate 31A and the diffractive optical element 32A may be provided separately. In the optical deflection element 30B, the reference standard plate 31B and the diffractive optical element 32B may be provided separately.

A combination of the diffractive optical element and a refractive element such as a cone lens may be used as the optical deflection element.

What is claimed is:

1. An apparatus for measuring a sample surface having a rotationally symmetric aspheric surface comprising:
    a white light source to output white light;
    an interferometer arranged to receive the output light from the light source and to output collimated light;
    a diffractive optical element having an annular diffraction grating composed of concentric annular areas, the diffractive optical element arranged to i) receive the collimated light from the interferometer, and ii) via a reference surface thereof, divide the collimated light incident thereon from the interferometer into a reference light and a measuring light,
    the reference surface of the diffractive optical element arranged to reflect back the reference light to the interferometer, and pass the measuring light toward the sample surface,
    the diffractive optical element being disposed between the interferometer and the sample surface along an optical path of the measuring light, the diffractive optical element deflecting the measuring light, by an angle determined by a wavelength of the measuring light and outputting the measuring light to the sample surface, the diffractive optical element deflecting a sample light that is the measuring light reflected back from the sample surface and outputting the sample light to the interferometer,
    the diffractive optical element arranged to deflect the received sample light to be incident on the reference surface, wherein the reference surface combines the sample light and the reference light into an interference light, the interference light being outputted to the interferometer;
    a wavelength analyzer arranged to analyze a wavelength of the interference light received from the interferometer, the wavelength analyzer comprising a reflecting-type diffraction grating plate, the wavelength analyzer outputting the interference light only when an inclination angle of the reflecting-type diffraction grating plate relative to an axis of the interference light inputted thereto and the wavelength of the interference light satisfy a predetermined condition;
    an imaging element arranged for receiving the interference light from the wavelength analyzer and forming an interference fringe image from the received interference light from the wavelength analyzer;
    an optical distance calculator arranged to calculate an optical distance between the reference surface and the sample surface along the optical path of the measuring light; and
    an analyzing control unit connected to i) receive optical distances from the optical distance calculator, and ii) receive interference fringe images from the imaging element and iii) analyze a shape of the sample surface based on each of the interference fringe images taken on a wavelength-by-wavelength basis of the interference light and the optical distance at the time of taking each of the interference fringe images.

2. The apparatus of claim 1, wherein a relative position between the reference surface and the sample surface is fixed.

3. The apparatus of claim 1, wherein the optical distance calculator includes:
    a detour section for dividing the output light into a first flux and a second flux and making the first flux travel longer than the second flux by a detour distance and then recombining the first and second fluxes into a single light; and
    a detour distance adjuster for adjusting the detour distance of the first flux relative to the second flux in the detour section,
    wherein the optical distance calculator calculates the optical distance between the reference surface and the sample surface based on the detour distance and the wavelength of the interference light.

4. The apparatus of claim 1, wherein the light source is a wavelength-variable laser.

5. The apparatus of claim 4, wherein the optical distance calculator includes:
    a detour section for dividing an output laser beam from the laser into a first flux and a second flux and making the first flux travel longer than the second flux by a detour distance and then recombining the first and second fluxes into a single laser beam;
    a detour distance adjuster for adjusting the detour distance of the first flux relative to the second flux in the detour section;
    a wavelength modulator for modulating a wavelength of the output laser beam within a time shorter than a frame period of the imaging element such that the output laser beam has a same coherence length as that of low coherent light; and
    a central wavelength scanner for scanning a central wavelength of the output laser beam in a predetermined range,
    wherein the optical distance calculator calculates the optical distance between the reference surface and the sample surface based on the detour distance and the central wavelength of the output laser beam.

6. The apparatus of claim 4,
    wherein the optical distance calculator includes a wavelength scanner for scanning wavelength of output laser beam from the laser in a predetermined range, and
    the optical distance calculator calculates the optical distance between the reference surface and the sample surface based on the number of times of changes in interference fringes in a predetermined pixel of the interference fringe images sequentially taken by the imaging section while the wavelength of the output laser beam is scanned.

* * * * *